United States Patent [19]
Hobbs

[11] Patent Number: 5,134,276
[45] Date of Patent: Jul. 28, 1992

[54] NOISE CANCELLING CIRCUITRY FOR OPTICAL SYSTEMS WITH SIGNAL DIVIDING AND COMBINING MEANS

[75] Inventor: Philip C. D. Hobbs, Ossining, N.Y.

[73] Assignee: International Business Machines Corporation, Armonk, N.Y.

[21] Appl. No.: 594,178

[22] Filed: Oct. 9, 1990

[51] Int. Cl.$^5$ .............................................. H01J 40/14
[52] U.S. Cl. ................................ 250/208.2; 250/575; 250/345
[58] Field of Search ..................... 250/208.2, 210, 575, 250/345, 344; 307/501, 311

[56] References Cited

U.S. PATENT DOCUMENTS

| | | | |
|---|---|---|---|
| 3,446,972 | 5/1969 | Bentley et al. | |
| 3,626,092 | 12/1971 | Wilson | 178/7.1 R |
| 4,032,801 | 6/1977 | Fulkerson | 307/311 |
| 4,118,621 | 10/1978 | Monticelli et al. | 250/214 A |
| 4,150,402 | 4/1979 | Tietze et al. | 358/280 |
| 4,185,278 | 1/1980 | Lintelmann et al. | 250/575 |
| 4,190,747 | 2/1980 | Feiner et al. | 179/170 NC |
| 4,467,203 | 8/1984 | Rappaport | 250/345 |
| 4,485,301 | 11/1984 | Gontowski et al. | 250/214 A |
| 4,491,730 | 1/1985 | Pedersen | 250/345 |
| 4,718,121 | 1/1988 | Epworth | 455/619 |
| 4,896,222 | 1/1990 | Fukai | 358/446 |
| 4,975,566 | 12/1990 | Uda | 250/208.2 |

Primary Examiner—David C. Nelms
Assistant Examiner—Que T. Le
Attorney, Agent, or Firm—Ratner & Prestia

[57] ABSTRACT

A noise suppression system is described for use with a laser measurement system in which a beam sampler divides the laser beam into a signal beam and a sample beam. The signal beam is passed through an optical system before being received at the detector while the sample beam is received directly at the detector. The beam sampler is selected such that the received sample beam has a slightly greater steady-state intensity than the received signal beam. The detector circuitry includes two linear wideband photodetectors which produce respective signal and sample currents of opposite polarity. The sample photocurrent is subdivided into two component currents, one of which has substantially the same direct current (DC) value as the signal photocurrent. This component is combined with the signal photocurrent to cancel undesirable noise components in the original laser beam. In a second embodiment of the invention, the dividing circuitry is controlled in a feedback loop to keep the DC portion of the output current at zero.

10 Claims, 4 Drawing Sheets

NOISE CANCELLING CIRCUITRY FOR OPTICAL SYSTEMS WITH SIGNAL DIVIDING AND COMBINING MEANS

FIELD OF THE INVENTION

The present invention concerns noise cancellation circuitry for use with optical measurement systems. In particular, the invention relates to a shot-noise limited, all electronic noise cancellation system which is suitable for use with a laser measurement system.

BACKGROUND OF THE INVENTION

The use of lasers for spectroscopy, for document scanning and for determining direction and range for objects moving in space (i.e. LIDAR) is known in the prior art. In each of these systems, light, generated by a laser is detected by electronic apparatus to make a measurement.

It has been recognized for some time that excess noise (i.e. noise above the shot noise level), spurious modulation and power drift in the laser can significantly reduce the accuracy of many measurements of laser light. In gas lasers, the noise levels can easily reach 50 dB above shot noise even at relatively high frequencies.

Shot noise is a random current fluctuation that occurs when light is detected. Conventional photodetectors, such as PIN diodes, pass current from their anode to their cathode in proportion to the number of photons that strike the detector. Each photon can generate only one electron. The random current fluctuations occur because the arrival of photons at the photodetector may be accurately modeled as a Poisson process. For any given time interval, there is an average number of photons that are expected to arrive at the detector and a standard deviation representing nominal variations from the average. It is this variation in the arrival of photons, causing a corresponding variation in the current passed by the photodetector, which causes the shot noise.

Since, however, the level of noise signals is usually the highest at low modulation frequencies, many high-precision optical measurement systems apply some sort of modulation to the beam. This makes the output signals of the measurement system periodic in time at a frequency that is sufficiently far above the low-frequency noise signals to substantially reduce the effect of the noise on the measurement.

Another method of reducing noise is to take a sample of the output beam and apply negative feedback to the laser operating current or to an external optical attenuator to keep the photocurrent, derived from the sample beam, constant. These systems tend to be complicated or expensive and can, at best, bring the signal-to-noise ratio of the output beam up to the signal-to-shot-noise ratio of the sample beam. Since, in these systems, the sample beam is usually appreciably weaker than the output beam and, so contains relatively more shot-noise, this method may not provide acceptable levels of noise reduction. In addition, since these systems depend on feedback, the effective bandwidth of the noise-reduced beam is often relatively small.

All-electronic noise suppression schemes have been known for some time. These schemes differ from those described above in that no attempt is made to stabilize the laser beam itself, only the photocurrent of the detected laser light. In these systems, a laser beam is typically split into a signal beam and a sample beam. The signal beam is passed through the optical system to one detector while the sample beam is passed around the optical system to another detector.

After detection, signal components in the signal beam emerging from the optical system which are also in the sample beam are cancelled electronically by subtraction or division. In the ideal, a system of this type produces an output current which represents a noise-free measurement.

These electronic methods rely on two important properties of the optical system: wide temporal bandwidth and highly linear photodetectors. Due to the wide bandwidth, the optical system does not introduce any differential gain or differential phase to the modulation of the beam as long as the relative path delays between the signal and sample beams are small. In this arrangement, the instantaneous fractional excess amplitude noise of the sample beam is substantially the same as that of the signal beam. The linearity of the photodetectors ensures that this is true for the photocurrents as well; thus if the DC components of the two photocurrents cancel, the excess noise components of the photocurrents also cancel at all frequencies of interest.

Most conventional all electronic noise cancellation systems either subtract the detected sample photocurrent from the signal photocurrent or divide the signal photocurrent by the sample photocurrent to achieve the noise reduction.

In the subtractive schemes, the optical system is desirably adjusted so that the photocurrents from the detected signal and sample beams are exactly equal. The result of the subtraction operation is a current representing the variations in the signal beam, without the DC component or any of the excess noise signal components of the signal beam. Subtracter can be designed to have relatively wide bandwidths since the photocurrents may be subtracted directly without prior conversion to voltages.

The addition of a properly adjusted subtracter can reduce the excess noise in a system by approximately 20 dB. This seems to be an practical limit on the improvement that can be obtained, however, since conventional subtraction systems require finicky adjustment of either the beam sampler, the optical system or the gain of one of the detector channels. Furthermore, because the steady-state intensity of the signal beam usually varies somewhat during a measurement, any null that is achieved by this process may be degraded during the operation of the device. In addition, the shot noise currents of the detected signal and sample photocurrents are uncorrelated and both contribute noise to the output current. Thus, the noise floor of the output current is limited to about 3 dB above the level of the shot noise in the signal photocurrent alone.

Dividing noise cancellation systems at first may appear to be more desirable than subtractive systems since they do not need precise adjustment and since they cancel fractional rather than absolute noise deviations. Unfortunately, dividers tend to be relatively slow, limiting the bandwidth of the noise suppressed signal. In addition, since dividers are inherently noisy, dividing may add significant amounts of noise to the signal.

U.S. Pat. No. 4,896,222 to Fukai relates to a system in which the sample photocurrent is electrically corrected and then subtracted from the signal photocurrent.

U.S. Pat. No. 4,718,121 to Epworth concerns a noise reduction system which uses variable gain amplifiers to reduce laser noise by subtraction. This system operates on two beat-frequency signals, one of which is the sum of a signal beam and a local oscillator beam and the other is the difference between these two beams. The system measures the noise and adjusts the gains of the two amplifiers to cancel the noise when the signals are summed.

U.S. Pat. No. 4,150,402 to Tietze et al. relates to a system which uses the sample photocurrent as a control signal for a variable gain amplifier which amplifies the signal photocurrent.

SUMMARY OF THE INVENTION

The present invention is embodied in a noise suppression system which balances the photocurrents derived from a signal beam and a sample beam provided by an optical system. With the currents balanced, any residual difference current is a signal representing the information content of the signal beam and is substantially free of any noise components having amplitudes greater than the shot noise in the signal and sample photocurrents. The circuitry which balances the two photocurrents includes circuitry configured to subdivide either the signal photocurrent or the sample photocurrent to produce a balanced output photocurrent having the same direct current component as the other one of the signal and sample photocurrents. The noise suppression system further includes circuitry which combines the two balanced signals to produce an output signal representing the information components of the signal current, substantially free of noise signal components.

According to a further aspect of the invention, the circuitry includes a feedback circuit which is responsive to the output signal of the combining circuit for biasing the signal subdividing circuit to maintain the balance between the current signal that it provides and the other photocurrent signal.

According to yet another aspect of the invention, the photocurrents derived from the sample and signal beams are in a ratio of N to 1 where N is greater than 2, and the circuitry further subdivides the photocurrent derived from the sample beam to achieve further shot noise reduction when the balanced sample photocurrent and signal photocurrent are combined.

DETAILED DESCRIPTION

Figure 1:
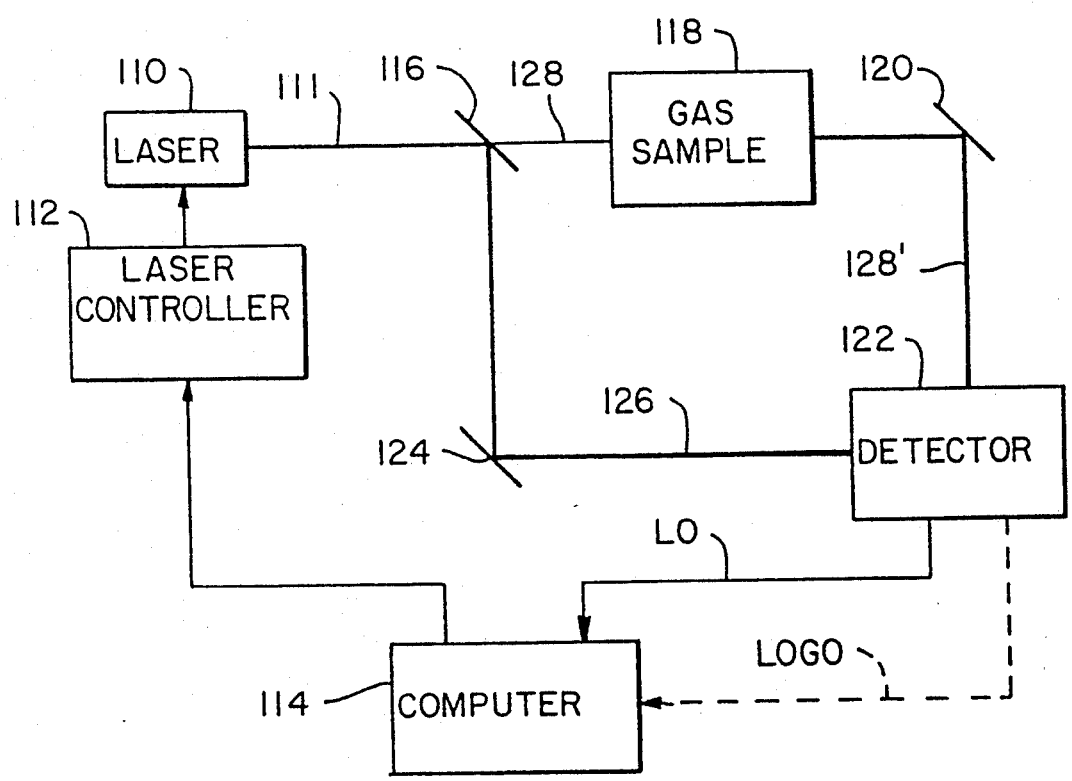
FIG. 1 is a block diagram of laser spectroscopy apparatus which includes an embodiment of the present invention.

In the apparatus shown in FIG. 1, a laser 110 is controlled by control circuitry 112 to produce an output beam of light, 111. The beam 111 is split by a half-silvered mirror or other suitable beam sampling device 116 into a signal beam 128 and a sample beam 126. The signal beam 128 is passed through a gas sample 118, and in so doing, is transformed into a modified signal beam 128'. The beam 128' is then reflected from a mirror 120 to reach the signal beam input port of a detector 122. The sample beam 126 is reflected from a mirror 124 to reach the sample beam input port of the detector 122.

A computer 114 sends control signals to the laser controller 112 which may, for example, tune the frequency of the beam provided by the laser 110 through a range of frequencies. The computer 114 is also coupled to the detector 122 to capture a linear output signal, LO, provided thereby. The computer 114 is optionally coupled to receive a log output signal, LOGO as shown by the phantom connection. This signal is described below in reference to FIG. 3. By correlating data derived from the signals LO and/or LOGO with the tuning of the laser 110, the computer 114 can derive information regarding, for example, the molecular structure of the gas sample 118.

In this embodiment of the invention, the beam sampler 116 is configured to pass slightly less than half of the incident beam 111 as the signal beam 128 and to reflect slightly more than half of the beam 111 as the sample beam 126. The signal beam is passed with little or no attenuation of its average light intensity through the gas sample 118.

If, however, the use of the signal beam produces significant attenuation, then the sampler 116 should be selected to reflect only enough of the incident beam 111 so that the illumination provided by the sample beam 126 arriving at the detector 122 is somewhat greater than that of the largest steady-state component of the beam 128'. An application of this type is one in which the signal beam is reflected off of a target to generate the modified signal beam 128'. For example, if the beam 128 is reflected off of an integrated circuit to expose or to perform measurements on photoresist.

In the detector 122, the signal beam 128' and sample beam 126 are converted into photocurrents. The sample beam photocurrent is subdivided, by an electronically controlled pair of transistors, configured as a differential pair, into two currents. One of these currents has substantially the same steady-state current amplitude as the signal photocurrent. This current is subtracted from the signal photocurrent to produce an output signal having only insignificant levels of the direct current (DC) and excess noise components of the signal photocurrent.

Since the sample photocurrent is always greater than the signal photocurrent and since division ratio of the differential pair is electronically controlled, only one adjustment of the electronic circuitry balances the sample and signal photocurrents. No separate adjustment of the optical system, or of the gain of the signal or sample channels is needed.

In a second embodiment of the invention, the adjustment which controls the balancing of the sample and signal photocurrents is controlled by using negative feedback to ensure that the difference of their DC components is zero. This embodiment is described below with reference to FIG. 3.

Figure 2:
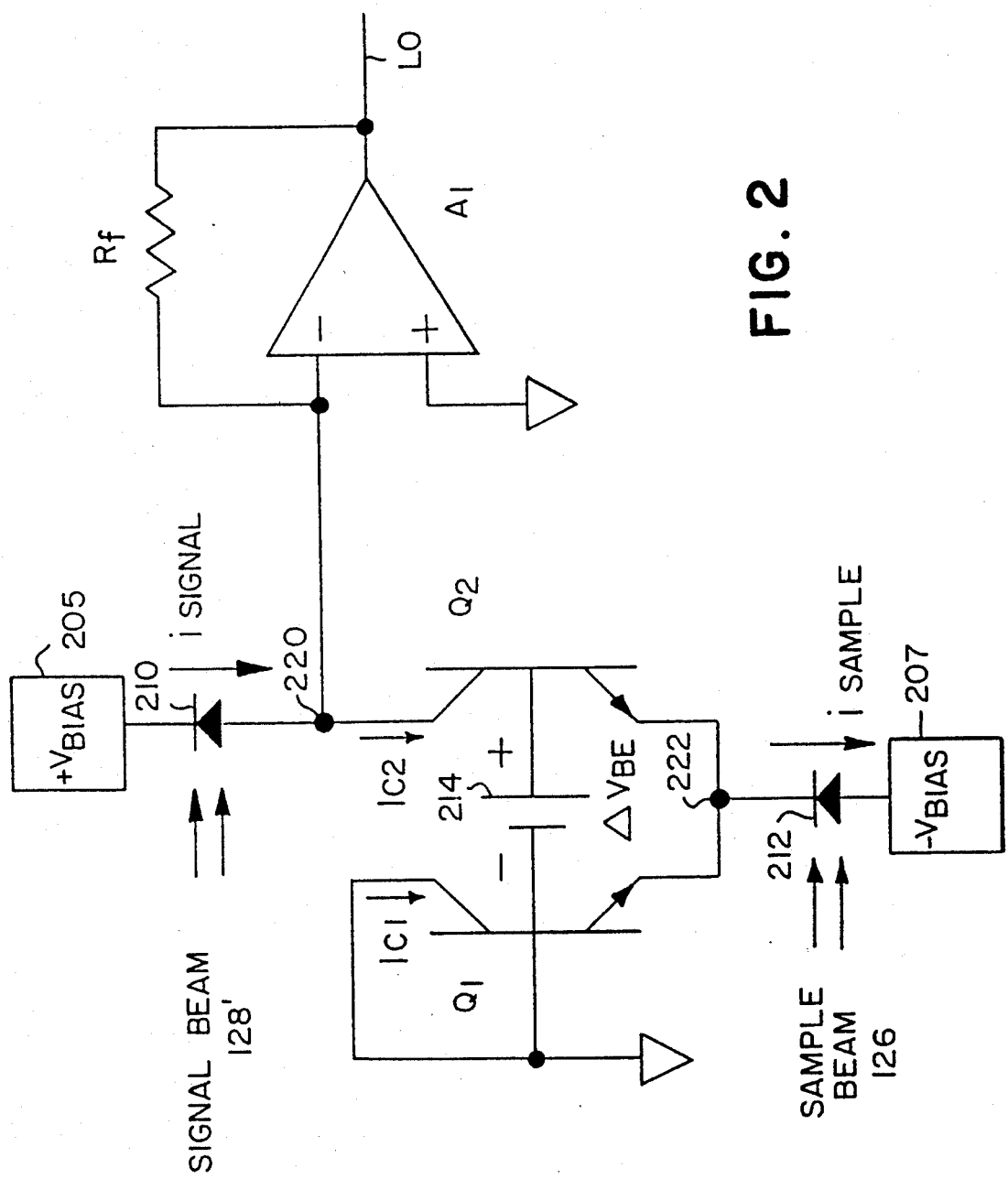
FIGS. 2, 3 and 4 are schematic diagrams, partially in block diagram form, showing detector circuitry of FIG. 1 which include respective first, second and third embodiments of the invention.

FIG. 2 is a schematic diagram, partly in block diagram form of exemplary circuitry which may be used as the detector 122, shown in FIG. 1. In this exemplary detector, a signal photodiode 210 and a sample photodiode 212 are activated by the respective signal beam 128' and sample beam 126 to pass current provided by sources of operational power 205 and 207, respectively. The photocurrent passed by the photodiode 210, less the collector current $I_{C2}$ of transistor Q2, is applied to the summing junction of a conventional transresistance amplifier A1. The amplifier A1 converts the net current at its summing junction to a voltage signal, LO which is the linear output signal of the detector 122.

The operational potentials provided by the respective sources 205 and 207 depend on the type of photodetectors used. In the exemplary embodiment, the photodetectors 210 and 212 are silicon PIN diodes and the sources 205 and 207 provide +12 volts and −12 volts, respectively.

The sample photocurrent passed by the photodiode 212 is applied to joined emitter electrodes of a pair of bipolar transistors, Q1 and Q2 which are configured as a differential pair. In the exemplary embodiment of the invention, the transistors Q1 and Q2 are fast, matched transistors having current gain—bandwidth products ($f_T$) of approximately 5 GHz. The collector and base electrodes of the transistor Q1 are coupled to a source of reference potential (e.g. ground), the base electrode of transistor Q2 is coupled to a source of bias potential 214. The source 214 may be of either polarity and has one terminal coupled to ground and its other terminal coupled to the base electrode of the transistor Q2.

It is not important that the base of transistor Q1 is coupled to ground. In an alternative configuration, the base electrode of transistor Q2 may be coupled to ground and the base electrode of transistor Q1 may not be connected to the collector electrode of Q1; in which case, the collector electrode of transistor Q2 is connected to a source of potential greater than is applied to the base electrode of transistor Q1. The key features of the circuit configuration shown in FIG. 1 are that there is a differential potential applied between the base electrodes of transistors Q1 and Q2 and that this differential potential controls the proportion of the sample photocurrent which is applied to the summing junction 220.

Although bipolar transistors are used in the exemplary embodiment of the invention, it is contemplated that other types of variable conductive devices, such as field effect transistors may be used in a similar configuration to perform the current division operation.

In operation, a portion, $I_{C2}$, of the sample photocurrent is passed by the transistor Q2 to the summing junction 220 while the remainder of the sample photocurrent, $I_{C1}$, is shunted to ground. As set forth above, the optical system is configured so that the sample beam is stronger than the signal beam. Thus, the sample photocurrent is always greater than the signal photocurrent. In this embodiment of the invention, the magnitude of the DC component of the current $I_{C2}$ is controlled to be substantially equal in magnitude to the DC component of the signal photocurrent by shunting the excess sample photocurrent to ground.

The potential $\Delta V_{BE}$ developed across the source 214 represents a difference in the respective base-emitter voltages, $V_{BE}$'s, of the transistors Q1 and Q2. Using the Ebers-Moll model of the two bipolar transistors Q1 and Q2, the respective collector currents passed by the transistors, $I_{C1}$ and $I_{C2}$ are defined by the equation (1)

$$\frac{I_{C2}}{I_{C1}} = \exp\left(\frac{q\Delta V_{BE}}{kT}\right) \quad (1)$$

where q is the electron charge, T is absolute temperature and k is Boltzmann's constant. Thus, by varying $\Delta V_{BE}$, the portion of the sample photocurrent that is passed to the summing junction 220 of the amplifier A1 can be controlled electronically.

In an actual implementation, the voltage source 214 may be variable and may be manually adjusted to achieve a DC level of zero in the signal LO provided by the amplifier A1. By controlling the DC component of the sample photocurrent applied to the summing junction 220, the circuitry shown in FIG. 2 ensures that the noise components and the direct current components of the laser beam are cancelled in the output signal LO. As set forth above, however, the shot noise components of the photocurrents are uncorrelated and combine additively in power in the signal LO. Thus, the noise floor of the signal LO is limited to approximately 3 dB above the shot noise level of the signal photocurrent. The bandwidth of the signal LO, however, is limited by the bandwidth of the amplifier A1. For optimum performance, it is desirable to select an amplifier A1 which has a relatively wide bandwidth and which adds only a small amount of noise to the signals it amplifies.

Since the collector currents of the transistors Q1 and Q2 are exponential functions of the voltage $V_{BE}$, the transconductances of the transistors Q1 and Q2 are proportional to their collector currents. Consequently, any fluctuation in the sample photocurrent is subdivided in substantially the same ratio as the DC component. Thus, by cancelling the DC components of the photocurrents, all variations in the signal and sample photocurrents which are related to excess noise components of the incident laser beams are also cancelled.

Figure 3:
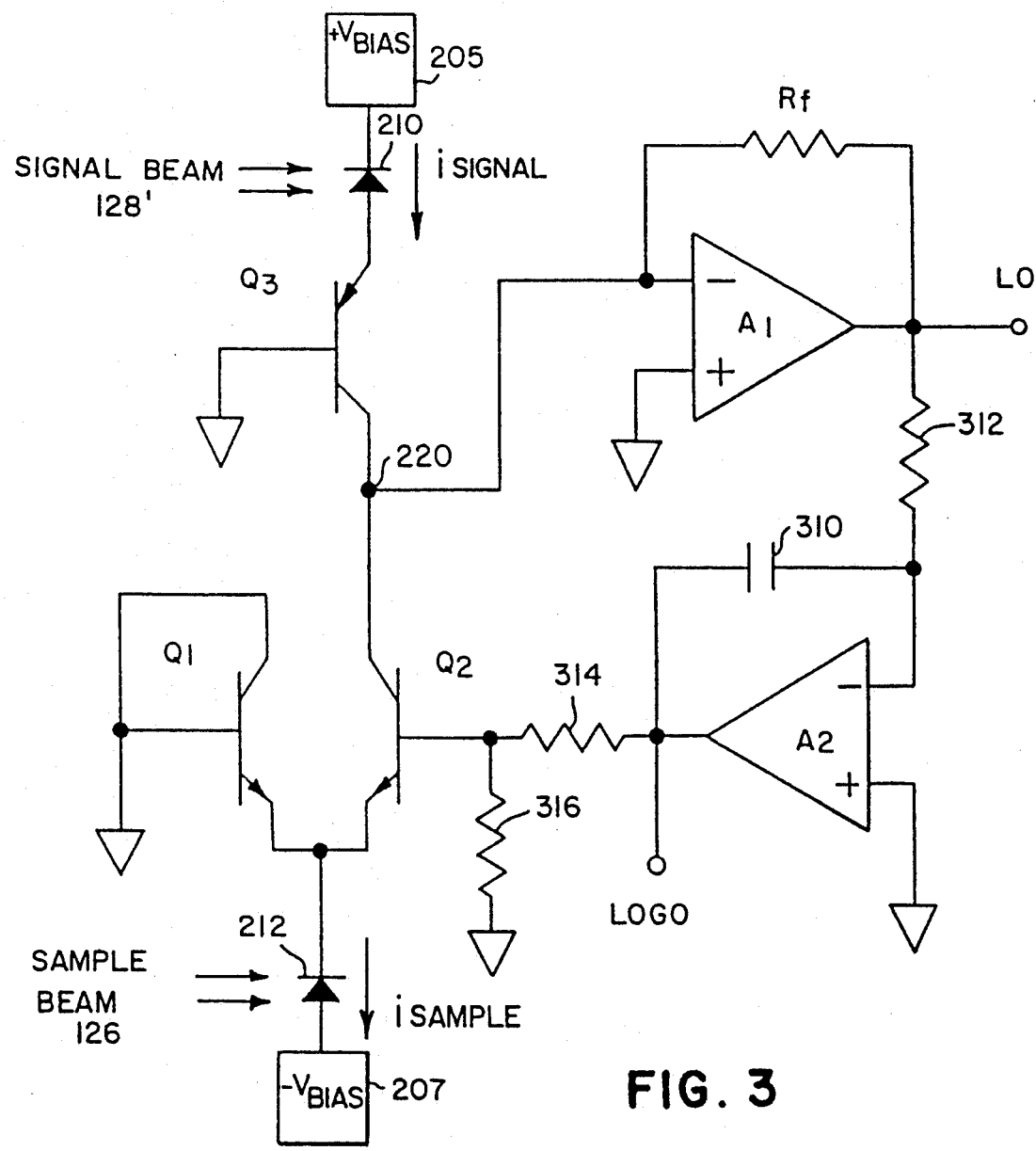

FIG. 3 is a schematic diagram, partly in block diagram form which illustrates an alternative embodiment of the circuitry shown in FIG. 2. The circuit in FIG. 3 includes a feedback loop to control the current division performed by the transistors Q1 and Q2 to ensure substantial cancellation of the DC component of the signal photocurrent and, thus, the noise components as well.

In the circuit shown in FIG. 3, a transistor Q3 is inserted as a cascode stage to isolate the summing junction of the transresistance amplifier A1 from the capacitance of the photodiode 210, which, as is well known, may cause the amplifier to become unstable.

The feedback loop in the circuitry shown in FIG. 3 includes an integrating servo amplifier which includes a resistor 312, a capacitor 310 and an operational amplifier A2. The frequency bandwidth of the feedback loop in the exemplary embodiment of the invention is approximately 10 Hz. In this embodiment of the invention, this frequency bandwidth is determined by the values of the resistor 312 and capacitor 310 and by the gain of the feedback loop as reduced by the voltage divider network formed by the resistors 314 and 316. The inventor has found that this bandwidth is sufficient in many cases to track the relatively low frequency drifts in the signal photocurrent which affect the DC component of the difference signal. It is contemplated, however, that by choosing different component values for the capacitor 310 and the resistors 312, 314 and 316, this bandwidth may be made narrower or considerably wider if desired.

The circuit configuration shown in FIG. 3 maintains a balance between the portion of the sample photocurrent passed by the transistor Q2 and the signal photocurrent passed through the cascode transistor Q3 which is sufficient to substantially cancel all but the shot noise components of the two photocurrents. This circuit is effective out to very high frequencies regardless of the bandwidth of the feedback loop since, as set forth above, the relative instantaneous noise fluctuations of the sample and signal photocurrents are essentially exactly proportional to their DC levels. The cancellation bandwidth limit is determined by the unity gain frequencies ($f_T$) of the transistors Q1, Q2 and Q3.

As an added benefit, the $\Delta V_{BE}$ for the transistors Q1 and Q2, provides an alternative output signal from the detector 122. In the embodiment of the invention shown in FIG. 3, this signal is proportional to the base voltage of the transistor Q2 as referenced to ground. The output signal LOGO, available at the output terminal of the servo amplifier A2, is proportional to the $V_{BE}$ of the transistors Q1 and Q2. LOGO is proportional to $\Delta V_{BE}$ as the ratio of the sum of the values of resistors 314 and 316 to the value of resistor 316.

Since LOGO is related to the ratio of the sample current to the signal current then, by the Ebers-Moll equation, LOGO can be described by equation (2)

$$LOGO = \frac{R_{314} + R_{316}}{R_{316}} \frac{kT}{q} \ln\left(\frac{I_{sample}}{I_{signal}} - 1\right) \quad (2)$$

If this signal is used as the output signal of the detector, then the performance of the detector is much like that of one of the divider noise cancelling circuits, described above. This is because the intermodulation noise of the signal current is suppressed in the signal LOGO, since the amplitude of LOGO depends only on the ratio of the signal photocurrent ($I_{signal}$) to the sample photocurrent ($I_{sample}$).

An important feature of the LOGO output signal is that, unlike the output of a divider circuit, the level of noise in the signal LOGO does not increase as the loop bandwidth is approached, since the DC cancellation effectively guarantees the cancellation of additive noise at all frequencies of interest. Only the suppression of noise intermodulation decreases. In a conventional divider circuit, by contrast, the level of excess noise in the output signal increases with frequency out to the bandwidth of the feedback loop.

Since the bandwidth of the LOGO output signal is limited by the bandwidth of the feedback loop, it may be desirable to decrease the time constant of the integrating servo amplifier A2 by decreasing the value of the capacitor 310, the value of the resistor 312 or both.

Although the transistors Q1 and Q2 are described as matched transistors, unmatched transistors may also be used if strict temperature stability of the output signal LOGO is not required. The circuit shown in FIG. 3 has been successfully implemented using unmatched transistors, each having an $f_T$ of approximately 5 GHz. Satisfactory performance has also been obtained using several different types of transistors having lower values of $f_T$.

For many uses, the large improvement in the noise performance achieved by the circuitry disclosed above is sufficient. For some uses, however, an even lower noise floor is desirable. An example of such a use would be in performing measurements on biological specimens, where the maximum dosage of light is limited.

Figure 4:
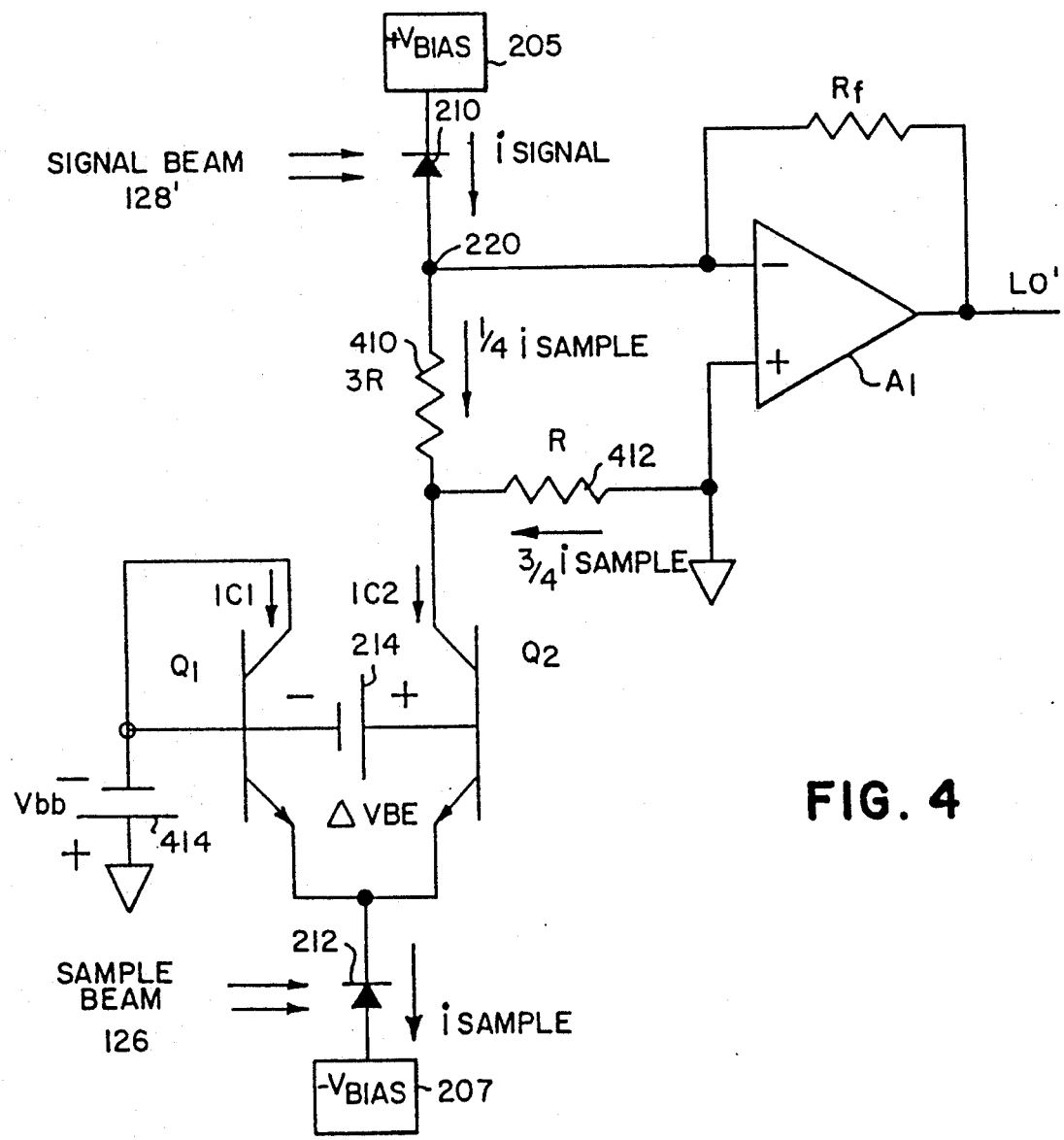

FIG. 4 illustrates a variation of the circuitry shown in FIG. 2 in which the noise floor of the output signal is reduced to approximately 1 dB above the shot-noise level. In this alternative embodiment, the beam sampler 116, shown in FIG. 1 is selected to provide four times as much power in the sample beam 126 as is provided in the signal beam 128'. As set forth above, the proportion of the beam 111 that is reflected by the sampler 116 depends on the losses in the signal beam for the chosen application.

When the sample beam 126 is detected by the photodiode 212, a sample photocurrent is produced which has a signal to shot-noise ratio that is 6 dB greater than the signal to shot-noise ratio of the sample photocurrent produced by the embodiments shown in FIGS. 2 and 3.

The exemplary embodiment of the invention shown in FIG. 4, is the same as that shown in FIG. 2 except that a resistor network, including resistors 410 and 412 is inserted between the collector electrode of the transistor Q2 and the summing junction 220 and a voltage source 414 has been inserted between the base electrode of transistor Q1 and ground.

The resistors 410 and 412 shunt three-fourths of the sample photocurrent to ground so that only one-fourth of the detected sample photocurrent is passed to the summing junction 220. The effect of the voltage source 214 is to bias the transistor Q1 so that a current $I_{C2}$, which is substantially four times the signal photocurrent, can be passed by the transistor Q2. As set forth above, the voltage source 214 may be a variable voltage source which may be adjusted to produce a zero DC level in the output signal LO', or may be replaced by the feedback system of FIG. 3, including the servo amplifier.

As set forth above, the signal to shot-noise ratio of the subdivided sample photocurrent that is applied to the summing junction 220 in this embodiment of the invention is 6 dB greater than the signal to shot-noise ratio of the sample photocurrents applied to the junction 220 in the previous embodiments. The resistor network does not degrade the signal to shot-noise ratio of the subdivided sample current. Consequently, the sum of the uncorrelated shot noise components of the signal and sample photocurrents at the summing junction 220 is only about 1 dB greater than the shot-noise component of the signal photocurrent alone.

Even greater shot-noise reduction may be achieved by choosing greater ratios between the signal and sample beams. The penalty paid for this reduction in the noise components of the output signal LO' is that the modified signal beam 128' has only one-fourth the power of the sample beam 126. Choosing large division ratios obviously makes no sense if it involves weakening the signal current excessively.

In a further alternative embodiment of the invention, where the sample photocurrent is much larger than the signal photocurrent the circuit shown in FIG. 2 is modified by coupling an equal quantity of one or more diodes (not shown) in a forward-biased configuration, between the respective emitter electrodes of the transistors Q1 and Q2 and the junction 222. These diodes provide voltage feedback to correlate the currents $I_{C1}$ and $I_{C2}$ to achieve substantially the same shot noise reduction advantage as is achieved by the circuitry shown in FIG. 4.

The system shown in FIG. 4 assumes that the loss in the optical system is large so that the splitting off of the sample beam from the signal beam does not weaken the signal beam appreciably. Alternatively, the system assumes that excess laser power is available so that the sample beam may be made significantly more powerful than the signal beam without reducing the effectiveness of the signal beam.

For weaker lasers and more efficient optical systems, it is useful to know the optimal ratio between the sample and signal beams. The method of selecting the optimum ratio assumes that the resistive divider formed by the transistors 410 and 412 is noiseless, that the current wasted through Q1 is negligible and that the noise to signal ratio in the output signal LO is the RMS sum of the noise to signal ratios of the sample and signal photocurrents. Given these assumptions, the optimal power reflectance, $\Gamma_{opt}$, of the beam sampler 116, for a given power efficiency, pe, of the optical system through which the signal beam provided by the beam sampler is to pass is given by equation (3).

$$\Gamma_{OPT} = \frac{\sqrt{pe}}{1 + \sqrt{pe}} \quad (3)$$

If pe is approximately equal to 1, $\Gamma_{opt}$ is approximately ½, while if pe is much less than 1, $\Gamma_{opt}$ is approximately the square root of pe. The noise penalty, NF, in decibels of an optimized system, as compared to an ideal system having a quiet laser which is entirely applied to the optical system is given by equation (4).

$$NF = 20 \log_{10}(1 + \sqrt{pe}) \quad (4)$$

For reasons of efficiency, it is desirable that the proportion of the sample current that is shunted to ground through transistor Q1 be as small as possible. Accordingly, in all of the embodiments described above, the sample beam should be limited to have a magnitude that is, for example, between 10% and 100% greater than is needed to cancel the signal photocurrent.

In the embodiments described above, the current division circuitry was configured to operate on the sample photocurrent. It is contemplated however that a differential pair of transistors (not shown) of opposite polarity to the transistors Q1 and Q2 may be used to subdivide the signal photocurrent in the same way that the transistors Q1 and Q2 subdivide the sample photocurrent. It is further contemplated two current dividers may be used in a feedback configuration such as that shown in FIG. 3 where output signals of one polarity are applied to the current divider coupled to receive the signal photocurrent while output signals of the other polarity are applied to the current divider coupled to receive the sample photocurrent. This configuration may be desirable when it is difficult to determine the maximum signal beam intensity at the detector.

Although the noise suppression systems described above are electronic devices, their primary application is in optical systems. Most laser-based optical systems are subject to excess laser noise and drift. Heroic measures are often taken to reduce the effects of these aberrations.

Examples of potential applications for this noise suppression system include: infra-red absorption spectroscopy, using a lead salt diode laser; detection of phase features in photoresist and of particles having dimensions less than 0.1 micron through scanning optical microscopy; homodyne detection of submicron aerosol particles by light scattering or extinction; detection of residual stress in thin films by detecting stress-induced birefringence; and thermoreflectance thermometry. A noise suppression system according to this invention may also be beneficial in coherent detection LIDAR (optical radar), laser scanning microscopy of biological specimens and various forms of interferometry, especially those that involve fringe tracking.

All of these systems have, in common, the need to measure a small signal against a large background. In some of these systems (e.g. diode laser spectroscopy), the available laser power is small so that optimization is important.

Since the noise suppression systems described above reduce the noise components of the detected laser signals by such a large factor, there are some subtle pitfalls that should be avoided. One such pitfall arises when there are differences in the level of laser noise in different parts of the beam cross-section and in different polarization states.

Some diode lasers, for example, exhibit position dependent noise due to the relatively low finesse of their resonators. Consequently, these lasers have relatively poor rejection of higher order Gaussian modes compared to most gas lasers. With lasers that exhibit a variation in noise level across the beam, it is important to ensure that both the signal and sample detectors see all of the beam cross section. With lasers that exhibit different levels of noise in different polarization states, it may be desirable to add a polarizer at the laser output to ensure that the sample and signal beams arise from the same polarization component of the beam produced by the laser.

While the invention has been described in terms of three exemplary embodiments, those skilled in the art will recognize that it may be practiced, as outlined above, with modifications within the spirit and scope of the appended claims.

The following table lists component values which may be used to construct the circuitry shown in FIGS. 2, 3 and 4.

TABLE 1

| Transistors | Q1, Q2 | MRF 904 or 2N3904 |
| --- | --- | --- |
| Transistor | Q3 | MM4049 or 2N3906 |
| Op. Amps | A1, A2 | OP-27 |
| Resistor | Rf | 5 K ohms |
| Resistor | 314 | 1 K ohms |
| Resistor | 316 | 25 ohms |
| Capacitor | 310 | 2 microfarad |
| Photodiodes | 210, 212 | BFW34 (mfd by Siemens) |

The invention claimed is:

1. A electronic signal noise suppression system suitable for use with laser measurement apparatus, comprising:

a source of signal current, representing information signals impressed on a carrier current signal which includes a steady state current that is modulated by undesirable noise signals;

a source of sample current, representing the carrier current signal to the substantial exclusion of any information signals, wherein the steady-state current component of said sample current is not equal to the steady-state current component of said signal current;

signal dividing means, coupled to receive the one of the signal current and the sample current having the larger steady-state current component, for subdividing the received current into first and second component current signals, having a ratio that is determined by a control signal; and combining means for additively combining said first component current signal and the other one of said signal current and said sample current in a sense which tends to cancel the steady-state current and undesirable noise signals from said signal current to produce an output signal representing the information component of said signal current.

2. The system of claim 1, wherein:

said dividing means includes first and second variable conduction devices, each having first and second electrodes that define a principal conduction path and a third electrode for applying a signal to control the conductivity of the principal conduction path;

the respective first electrodes of said first and second variable conduction devices are coupled to receive the one of the signal current and the sample current having the larger steady-state current component;

The second electrode of said first variable conduction device are coupled to a source of reference potential;

the second electrode of said second variable conduction device is coupled to said combining means; and the control signal for said dividing means is applied as a differential signal between the respective third electrodes of the first and second variable conduction devices.

3. The system set forth in claim 2 wherein said first and second variable conduction devices are bipolar transistors.

4. The system of claim 1, further including:
feedback means, coupled to receive the output signal of the combining means, for controlling the signal dividing means to produce a first component current signal which, when combined with the other one of the signal and sample current signals produces said output signal having a steady-state current that is approximately equal to zero.

5. The system of claim 4 wherein said feedback means includes integrating servo amplifier means.

6. The system of claim 5, wherein:
said dividing means includes first and second variable conduction devices, each having first and second electrodes that define a principal conduction path and a third electrode for applying a signal to control the conductivity of the principal conduction path;

the respective first electrodes of said first and second variable conduction devices being coupled to receive said the one of the signal current and the sample current having the larger steady-state current component;

The second electrode of said first variable conduction device is coupled to a source of reference potential;

the second electrode of said second variable conduction device is coupled to said combining means; and the control signal for said dividing means is applied as a differential signal between the respective third electrodes of the first and second variable conduction devices.

7. The system set forth in claim 6 wherein said first and second variable conduction devices are bipolar transistors.

8. In a laser measurement system including a source of laser light having undesirable noise signal components, a beam sampler which divides the laser light into a sample beam and a signal beam, and an optical system which modulates the signal beam with information, detecting apparatus comprising:
first and second detector means for converting the respective signal and sample beams into respective signal and sample photocurrents, having respective steady-state current values that are proportional to the intensities of the signal and sample beams, respectively;

current dividing means for subdividing said sample photocurrent into first and second component sample photocurrents, said first component sample photocurrent having a steady-state current value that approximates the steady-state current value of said signal photocurrent; and means for combining said first component sample photocurrent with said signal photocurrent in a sense which tends to cancel the respective steady-state currents, to produce an output signal representing the information component of said signal beam to the substantial exclusion of said undesirable noise signal components.

9. In a laser measurement system including a source of laser light having undesirable noise signal components, a beam sampler which divides the laser light into a sample beam and a signal beam, and an optical system which modulates the signal beam with information, a method of separating the information from the undesirable noise components of said signal beam, said method comprising the steps of:
converting the respective signal and sample beams into respective signal and sample photocurrents, having respective steady-state current values that are proportional to the intensities of the signal and sample beams, respectively;

dividing said sample photocurrent into first and second component sample photocurrents, said first component sample photocurrent having a steady-state current value that approximates the steady-state current value of said signal photocurrent; and combining said first component sample photocurrent with said signal photocurrent in a sense which tends to cancel the respective steady-state currents, to produce an output signal representing the information component of said signal beam to the substantial exclusion of said undesirable noise signal components.

10. A electronic signal noise suppression system suitable for use with laser measurement apparatus, comprising:
a source of signal current, representing information signals impressed on a carrier current signal which includes a steady state current that is modulated by undesirable noise signals;

a source of sample current, representing the carrier current signal to the substantial exclusion of any information signals, wherein the steady-state current component of said sample current is greater than an integer N times the steady-state current component of said signal current;

first signal dividing means, coupled to receive the one of the signal current and the sample current having the larger steady-state current component, for dividing the received current into first and second component current signals, having a ratio that is determined by a control signal;

second signal dividing means, for subdividing the first component current signal provided by said first dividing means by N to produce a subdivided first component current signal; and combining means for additively combining said subdivided first component current signal and the other one of said signal current and said sample current in a sense which tends to cancel the steady-state current and undesirable noise signals from said signal current to produce an output signal representing the information component of said signal current.

* * * * *